(12) United States Patent
Tseng

(10) Patent No.: US 6,652,719 B1
(45) Date of Patent: Nov. 25, 2003

(54) ELECTROLYSIS SYSTEM

(75) Inventor: Anthony Tseng, Monterey Park, CA (US)

(73) Assignee: Skydon Corp., City of Industry, CA (US)

( * ) Notice: Subject to any disclaimer, the term of this patent is extended or adjusted under 35 U.S.C. 154(b) by 0 days.

(21) Appl. No.: 10/161,296

(22) Filed: Jun. 3, 2002

(51) Int. Cl.[7] .............................. C25B 9/00; C25C 7/00; C25D 17/00

(52) U.S. Cl. ..................... 204/257; 204/269; 204/278

(58) Field of Search .......................... 205/618, 620, 205/628, 637; 204/252, 253, 257, 269, 275.1, 278, 258, 263, 266

(56) References Cited

U.S. PATENT DOCUMENTS

| | | | | |
|---|---|---|---|---|
| 5,037,518 A | * | 8/1991 | Young et al. | 204/228.5 |
| 6,033,549 A | * | 3/2000 | Peinecke et al. | 205/335 |
| 6,309,521 B1 | * | 10/2001 | Andrews et al. | 204/252 |
| 6,375,812 B1 | * | 4/2002 | Leonida | 204/269 |
| 6,468,412 B2 | * | 10/2002 | Bryan et al. | 205/500 |

* cited by examiner

*Primary Examiner*—Roy King
*Assistant Examiner*—Wesley A. Nicolas
(74) *Attorney, Agent, or Firm*—Maria Erlinda Co Sarno

(57) ABSTRACT

An improved electrolysis system having components for separating gases, especially toxic gases produced along with electrolyzed liquids from the respective chambers of the electrolysis cell; for reprocessing and recovering the separated gas/es into useful products; and for treating new or used electrolyzed liquids obtained from the chambers of the electrolysis cell prior to discharge into the environment.

24 Claims, 13 Drawing Sheets

ELECTROLYSIS SYSTEM

BACKGROUND

The invention is an improved electrolysis system. The improvements may be applied to all systems involving electrolysis, a chemical reaction carried out by passage of electric current through a solution of an electrolyte or through a molten salt. The electrolysis system illustrated herein is used for producing electrolyzed liquids, herein acidic water with virucidal and bacteriocidal properties similar to that used for drinking water with claimed medicinal properties.

Hypochlorous acid as a virucidal and bacteriocidal agent, i.e. sanitizing component, is typically produced by electrolysis of water and chlorinated salts pumped into an electrolysis cell. The chlorinated salt usually come from brine, a solution of sodium chloride and water, due to the latter's low cost and availability. Other sources of chloride ions, however, can also be used. Halogen ions such as chloride and bromide are usually added to the feed water to increase the electrical conduction of the cell. The electrolysis of water and brine, hereinafter salt water, also produces aside from hypochlorous acid, hydrochloric acid, sodium hydroxide, chlorine and hydrogen as primary products. Conventional electrolysis cells used for producing electrolyzed liquids are equipped with at least an anode and a cathode in the interior and typically have a dual structure in which the anode and cathode are usually separated by a membrane to divide the cell into an anode chamber and a cathode chamber. The barrier membrane provide the advantage of preventing the products at the anode chamber from mixing with the products from the cathode chamber. Electrolysis is performed by application of a current to the electrodes, the anode and the cathode. In the electrolysis of salt water, at the anode, hydroxide ions [$OH^-$] contained in the salt water give electrons to the positive electrode to become oxygen gas. Thus, the concentration of hydrogen ions [$H^+$] in the water flowing through the space between the barrier membrane and the anode, the anode chamber, increases to make the water acidic, hereinafter referred to as acidic water. Also at the anode (positive electrode), chloride ions [$Cl^-$] contained in salt water give electrons to the anode to become chlorine gas. The chlorine gas dissolves in the acidic water at the anode chamber to become hypochlorous acid, a component that gives its virucidal and bacteriocidal effect. Not all of the chlorine gases, however, may dissolve completely in the acidic water, some may still exist as chlorine gas which pose a toxicity problem during the collection of the acidic water from the anode chamber. At the cathode (negative electrode), hydrogen ions [$H^+$] contained in the salt water are given electrons from the negative electrode to become hydrogen. Also, at the cathode, sodium ions [$Na^+$] and hydroxide ions [$OH^-$] contained in salt water are bonded together to become sodium hydroxide, therefore, the water flowing through the space between the barrier membrane and the cathode, the cathode chamber, becomes alkaline, hereinafter referred to as alkaline water. The evolved hydrogen, although flammable, explosive and reduces the oxygen level in an enclosed area, do not pose the same degree of danger as the chlorine gas because it is lighter than air while the chlorine gas is heavier than air and therefore can be easily inhaled by the operators and users of the electrolyzed water.

Chlorine and hydrogen are usually not the only gases liberated or produced during the electrolysis because tap water instead of deionized or distilled water, and brine instead of a pure solution of sodium chloride in distilled water, are used.

The acidic water produced from the anode chamber, depending upon the level of hypochlorous acid, has numerous known usage. The alkaline water produced at the cathode chamber during the electrolysis of tap water alone, is often used as drinking water and has been proposed to have medicinal effect and applications. The alkaline water from the cathode chamber produced by the electrolysis of tap water and brine, most often, is discarded. One aspect of the invention is to react this alkaline water from the cathode chamber produced from the electrolysis of brine and water, with the liberated chlorine gas to produce sodium hypochlorite solution, the component of what is commonly known as bleach. Another usage is to react the alkaline water with the used acidic water or vice-versa to solve the problem associated with the discharge of these electrolysis products/electrolyzed liquids into the sewage system.

Several improvements to the electrolysis system have been incorporated in the past such as the ability to control electric conductivity of the salt water, the oxidation-reduction potential, the sanitizing level and the pH of the products.

These electrolysis systems comprising the electrolysis cell and incorporated accessories do not address several problems like the discharge of toxic and hazardous gases, such as chlorine and hydrogen during the electrolysis of salt water, into the surrounding environment except to recommend that the process be done in a well ventilated area or the discharge of these electrolyzed liquids into the sewage system.

It is therefore an object of this invention to provide an electrolysis system that addresses the amount of toxic and hazardous gases liberated into the surrounding air.

It is also an object of this invention to utilize the liberated chlorine gas from the electrolysis of chlorinated electrolytes, to produce sodium hypochlorite, the major component of the common household bleach or to recycle the chlorine gas into the electrolysis system.

It is a further object of this invention to provide a mechanism for detecting and controlling the level of chlorine gas discharged into the environment during the electrolysis of chlorinated electrolytes It is also a further object of this invention to provide a safe method for discharging the spent electrolysis products into the sewage system.

SUMMARY OF THE INVENTION

Figure 1:
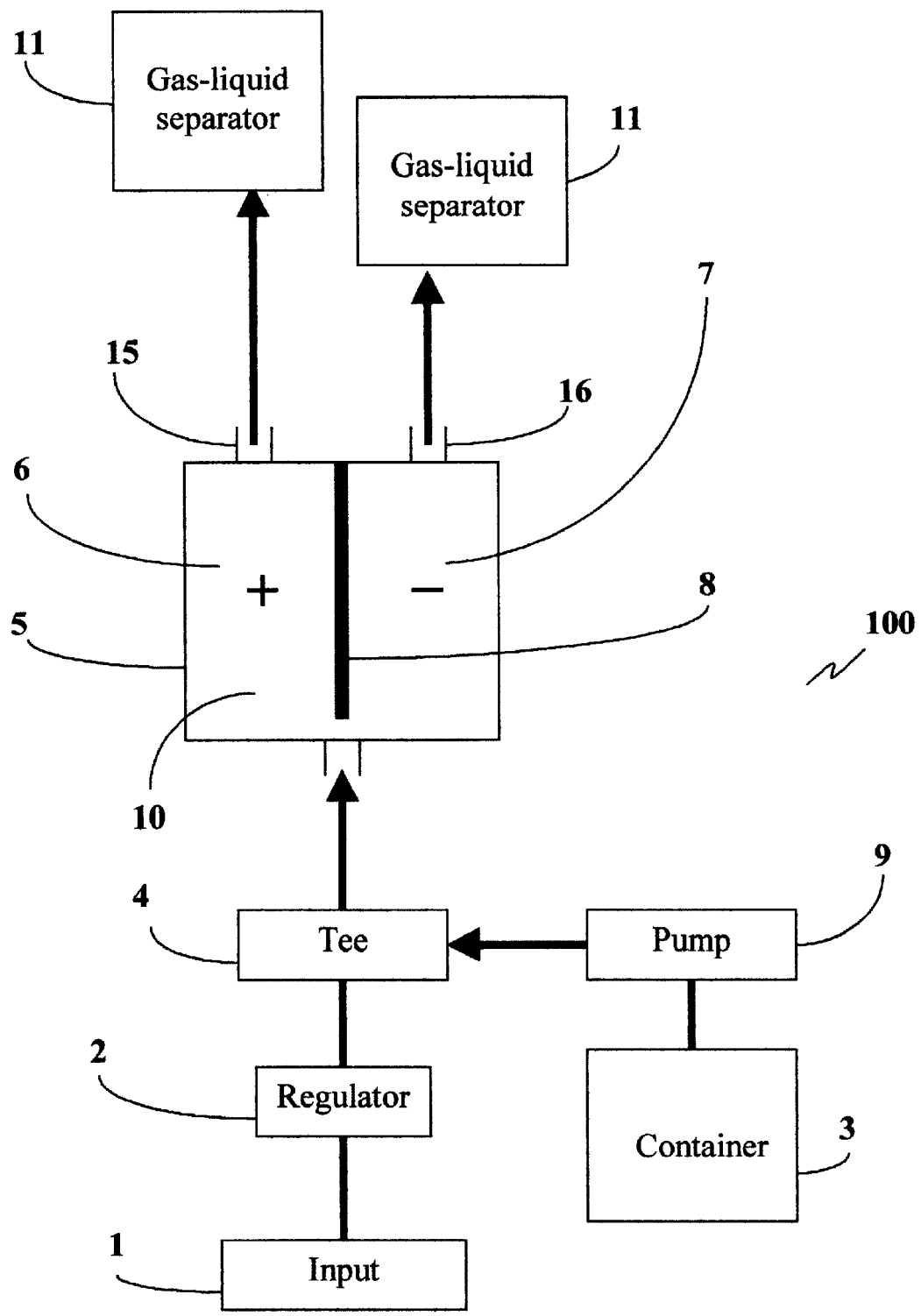
FIG. 1 shows a diagram of the interconnection of the different components making up the front end of the electrolysis system and the flow of water and brine from the feed to an electrolysis cell.

This invention is an improved electrolysis system for producing electrolyzed liquids comprising: an electrolysis cell having at least two chambers, an anode chamber and a cathode chamber, each chamber producing its own electrolyzed liquid; means for separating gases produced along with the electrolyzed liquids during electrolysis; means for controlling the proportions of the feed solutions introduced into the electrolysis cell; means for collecting the gases from the gas-liquid separator; and, means for collecting the electrolyzed liquid from the gas-liquid separator. One of the means for separating the gas produced along with the electrolyzed liquid is to pass the electrolyzed gas liquid mixture through a gas liquid separator. The gas liquid separator comprise at least two containers, a first container for separating gas from a gas liquid mixture and a second container for receiving gas reduced or gas free liquid, the first container for separating gas from the gas liquid mixture having an outlet port for the gas reduced or gas free liquid below the level of the gas in the container, a separate outlet port for the separated gas, and a volume above the outlet port for the gas reduced or gas free liquid enough to hold the volume of the separated gas, the second container for receiving gas reduced or gas free liquid having a height taller than the height of the first container to hold enough volume that can exert pressure on the liquid inside the first container to allow or force the separated gas to escape from the gas outlet port of the first container while allowing the gas reduced or gas free liquid to exit at a separate outlet port of the second container. The containers of the gas-liquid separator can have different geometric shapes. Each chamber can be connected to a gas-liquid separator or a number of these and an electrolysis system set up can have the same type or different types of gas-liquid separators connected to each chamber. Several gas-liquid separators are recommended if several gases of differing chemical and physical characteristics are to be separated or if the nature of the gas to be separated requires more than one gas-liquid separator for efficient separation. Several methods are proposed for maintaining the separation of the gas from the liquid and preventing the recombination of the separated gas and liquid. The system employs regulators and pump for controlling the proportions of the feed solutions fed into the electrolysis cell and collection tanks for storing the electrolyzed liquid products when not immediately used. The electrolysis system may employ a vacuum pump for facilitating the collection of gases produced during electrolysis. When a vacuum pump is used, it is preferable to have a moisture trap installed before the vacuum pump or have a level switch having a detecting component connected to the vacuum pump that turns on the vacuum pump only when the liquid level is below the detecting component to prevent moisture or liquid from entering the vacuum pump.

The separated gases can be absorbed or adsorbed for discard or further processing. However, it is recommended to reprocess and recover the separated gas immediately. For example, the chlorine gas produced during the electrolysis of brine can be reacted with alkaline water from the cathode chamber to form sodium hypochlorite or a bleaching solution. The chlorine gas can also be combined with the feed solution to produce a more concentrated hypochlorous acid or reduce the requirement of brine. A method for reprocessing and recovering chlorine gas during the electrolysis of salt water, comprises: introducing acidic water from an anode chamber of an electrolysis cell into an inlet port of a first container of a gas-liquid separator at a rate greater or equal than the flow of the acidic water from the gas-liquid separator, the acidic water from the anode chamber flowing from the first container to a second container from an outlet port of the first container to the second container as the gas separates from the acidic water introduced into the first container and collects and discharges from a gas outlet port of the first container; continuously flowing the acidic water from the first container into the second container until the electrolysis is completed, keeping the level of the acidic water in the second container above the level of the introduced acidic water in the first container to a volume sufficient to provide enough pressure to keep the separated chlorine gas collecting and discharging from the gas outlet port of the first container; collecting the gas reduced or gas free electrolyzed liquid from an outlet port of the second container for use or storage; collecting the separated chlorine gas from the gas outlet port of the first container; and, reacting the collected chlorine gas with alkaline water from a cathode chamber of the electrolysis cell to produce sodium hypochlorite or a bleaching solution or reacting the collected chlorine gas with water to produce hypochlorous acid. While this example applies to the electrolysis of salt water, this process is also applicable to chlorine that may be evolved in the electrolysis of other feed solutions. Therefore, in these cases, any electrolyzed gas liquid mixture containing chlorine gas is introduced into the first container instead of the acidic water used here for illustration.

This electrolysis system is environmentally safe because it can reduce the level of toxic gases liberated into the atmosphere and it provides a process for treating the electrolyzed liquids from the chambers of the electrolysis cell before discharge into the environment. The electrolyzed liquids from the anode chamber, for example acidic water and from the cathode chamber, for example alkaline water, produced from the electrolysis of salt water, may be recombined after their respective usage or storage if only one electrolyzed liquid is utilized, to neutralize or reduce their respective pH conditions before discharge into the environment.

The system provides a method for separately collecting gas from an electrolyzed gas liquid mixture using a gas-liquid separator, comprising: introducing an electrolyzed gas liquid mixture from an electrolysis chamber into an inlet port of a gas-liquid separator at a rate greater or equal than the flow of the gas reduced or gas free electrolyzed liquid from the gas-liquid separator, the electrolyzed gas-liquid mixture flowing from a first container to a second container from an outlet port of the first container to an inlet port of the second container as gas separates from the electrolyzed gas liquid mixture and collects and discharges at a gas outlet port of the first container; continuously flowing the gas reduced or gas free electrolyzed liquid from the first the container to the second container until the electrolysis is completed, keeping the level of the electrolyzed liquid in the second container above the level of the electrolyzed liquid in the first container to a volume sufficient to provide enough pressure to keep the separated gas collecting and discharging at the gas outlet port of the first container; continuously collecting the gas reduced or gas free electrolyzed liquid from an outlet port of the second container; and, continuously collecting the separated gas from the gas outlet port of the first container. The gas-liquid separator may be cleaned by periodically switching the positions of the gas-liquid separators connected to the electrolysis cell, that is, the gas-liquid separator connected to the anode chamber is periodically switched to the cathode chamber. If two gas-liquid separators are used, each electrolysis chamber connected to each own gas-liquid separator, for cleaning, these are simply periodically switched, that is, the gas liquid separator at the anode chamber is switched to the cathode chamber and vice versa.

DETAILED DESCRIPTION OF THE INVENTION

An electrolysis system 100 for producing electrolyzed liquids, herein illustrated by the production of acidic and alkaline waters through the electrolysis of salt water as an example, is shown in FIG. 1. A mixture of tap water and brine is fed into the electrolysis cell. Tap water fed into input 1 goes to a regulator 2 which regulates the flow of water that is mixed with brine pumped from a storage container 3. The desired ratio or proportion of tap water and brine, collectively also referred to herein as feed solutions, are mixed as they pass through a tee 4. The resulting feed solution having the desired chloride concentration typically obtained by calculation from the chloride concentration of the feed solutions is fed to the electrolysis cell 5 comprising at least two chambers, an anode chamber 6 and a cathode chamber 7 typically separated by a membrane 8. At the cathode chamber 7, the electrolyzed liquid primarily produced is sodium hydroxide with hydrogen as the gas, identified herein as alkaline water while hydrochloric acid and hypochlorous acid are the electrolyzed liquid primarily produced at the anode chamber 6, the hypochlorous acid is produced by the dissolution of chlorine in water. This electrolyzed liquid from the anode chamber is identified herein as acidic water. With the combination of the regulator 2 and pump 9 aided by a tee 4 for mixing the feed solutions at a given current conditions, one is able to target the acidic water with a desired set or range of hypochlorous acid content. Chlorine gas 10 is produced at the anode and as more chlorine gas is produced, the pH of the solution at the anode chamber 6 is lowered or the halogen ion concentration is increased. Additionally, the virucidal and bacteriocidal effect is increased due to an increase in the hypochlorous acid concentration. However, the level of chlorine gas 10 likewise increases. Chlorine gas is toxic and will be discharged from the system to the detriment of the operator or user. Some manufacturers are confronting this problem by advising the users to put the current electrolysis system in a well ventilated area. This approach may be sufficient when only low levels of chlorine or hydrogen are evolved. Further, relying on the ability of the room ventilation to lower the level of liberated toxic gases to safe levels is risky. As the users attempt to produced water with stronger virucidal and bacteriocidal effect, potentially more chlorine and hydrogen gases are expected to be liberated. Other toxic gases as by products from the impurities present in the brine and tap water feed solutions as well as a consequence of the electrolysis conditions employed may also be evolved.

Figure 2:
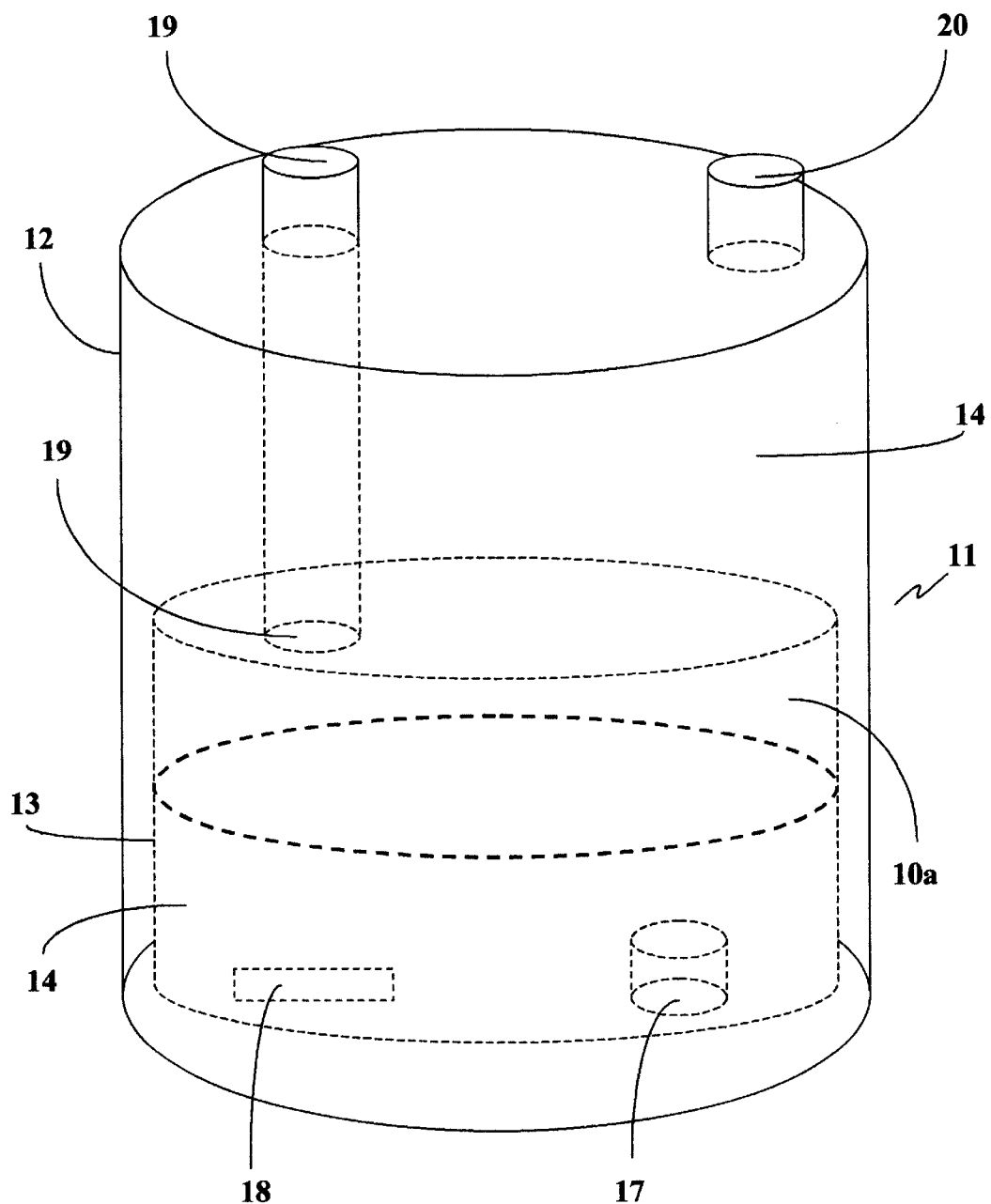
FIG. 2 shows an example of a simplified gas-liquid separator suitable for use with an electrolysis system.
Figure 2A:
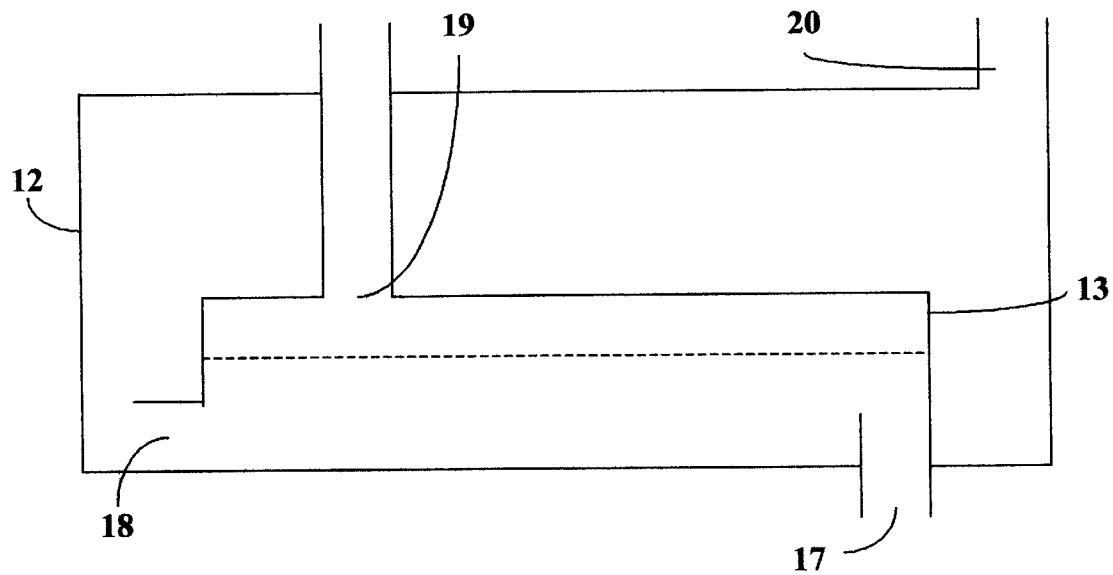
FIGS. 2A and 2B show different designs of the inner container within the gas-liquid separator shown in FIG. 2.
Figure 2B:
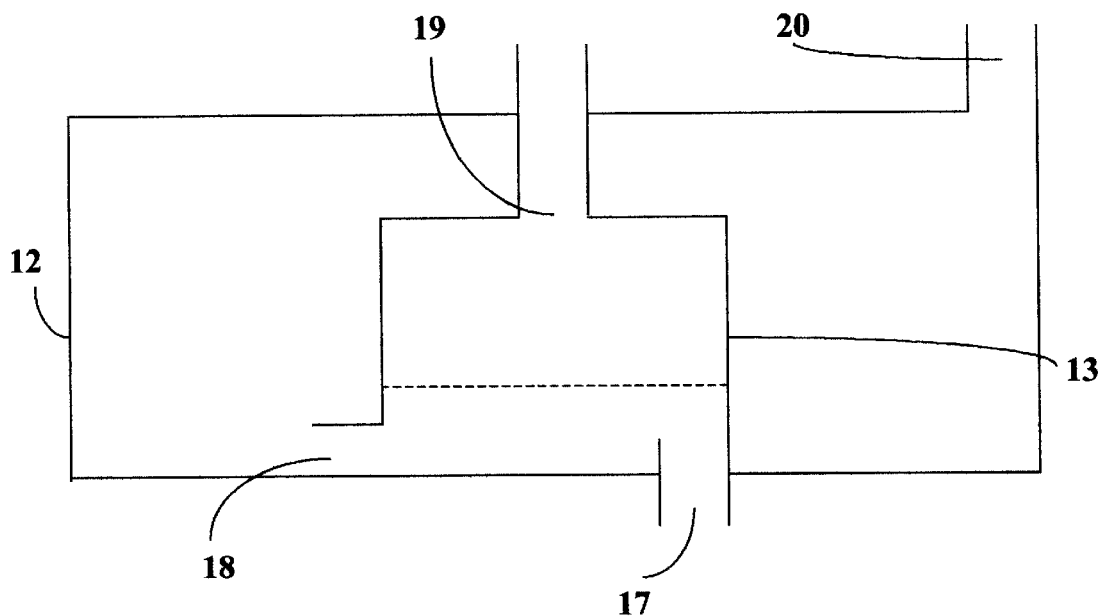

To determine if toxic gases are a cause for concern, using a commercially available electrolysis system and chlorine as the marker gas, the amount of chlorine gas liberated during the production of acidic water with an approximate concentration of 20 ppm (parts per million) of produced hypochlorous acid was determined. Electrolysis was done according to the manufacturer's instructions. At this concentration of hypochlorous acid, it was found that the chlorine gas liberated into the atmosphere or environment after approximately one hour, was above 1 ppm, greater than the permissible level allowed by the regulatory agencies such as OSHA (Occupational Health and Safety Administration of the United States). The free and total chlorine were tested using commercially available chlorine tests. The chlorine gas is separated or isolated from the acidic water produced and isolated at the anode chamber by a gas-liquid separator 11 shown in FIGS. 2, 3, 3A, 4 and 6. Although illustrations show only one gas-liquid separator, one can have a gas-liquid separator for each chamber, the anode and the cathode, and one may also employ a series of gas-liquid separators arranged in parallel or in series for one electrolysis cell chamber or for each electrolysis chamber especially if it is determined that it requires more than one gas-liquid separator to eliminate or reduce the liberated toxic gases to an acceptable level or if there are several gases to be separated instead of one or two. The gas-liquid separator can be designed differently. The gas-liquid separator 11 shown in FIG. 2 comprise a outer container 12 over an inner container 13 having a liquid 14. The actual separation of the gas from the liquid occurs at the inner container. The electrolyzed liquids produced along with the gases to be separated is introduced into the inner container for separation and the outer container receives the gas reduced or gas free electrolyzed liquid. For trapping or isolating gases from electrolyzed gas liquid mixtures, herein chlorine gas and other gases that may be produced along with the electrolyzed liquid, for example acidic water from the anode chamber, acidic water is used to fill the gas-liquid separator 11. For hydrogen and other gases produced in the cathode chamber, the same holds true except that alkaline water is used instead of acidic water to fill the gas-liquid separator 11. Throughout the description provided here, while chlorine gas from the anode chamber is the one used for illustration, the same applies to the other gases such that if one chose to trap and recover the gases from the two chambers, at least one gas-liquid separator is connected at the outlet port 15 of the anode and at least one gas-liquid separator is connected at the other outlet port 16 of the cathode chamber and each is filled with the respective electrolyzed liquids produced in the anode and in the cathode. Herein, the acidic water from the anode chamber will be used for illustration. The inner container 13 is an enclosed container as shown in FIG. 2 having an inlet port 17 for the acidic water coming from the anode chamber, a first outlet port 18 for the acidic water inside the inner container 13 and a second outlet port 19 preferably on top of the inner container 13 for the gas/es 10a separated from the acidic water inside the inner container 13. The inlet port 17 preferably delivers the acidic water above the outlet port 18. The first outlet port 18, connecting the two containers, from the inner container to the outer container is preferably located at the bottom of the inner container 13 but this may be placed at other locations along the walls of the inner container 13 so long as the outlet port 18 is below the level of the trapped gas 10a inside container 13. The second outlet 19 for the gas can be at any location on top of the inner container. However, an outlet port 19 farthest from the inlet port 17 will maximize the gas separation because this allows more time for the gas to partition and/or separate from the gas liquid mixture as shown in FIG. 2A compared to that shown in FIG. 2B. The shape of the containers may vary according to the designer's discretion. Herein, the inner 13 and outer container 12 are cylindrical. The containers need not be of the same shapes, also. For example, the outer container may be rectangular but the inner container is cylindrical and vice versa. These geometric shapes are simply for illustration and not a requirement. The outer container 12 as shown in FIG. 2, has an inside surface larger than the outside surface of the inner container 13 to accommodate and surround the inner container and has a height taller than the height of the inner container 13 so that the liquid level inside outer container 12 is above the top surface of the inner container 13. Container 12 should have enough volume to exert enough pressure on the liquid inside the inner container to keep the gases collected inside container 13 escaping at port 19 instead of port 18. To maximize the separation of the gases from the liquid, the inner container should be as wide as possible and as short as possible as shown in FIG. 2A. This provides a greater surface area for the gas to separate and/or partition from the gas-liquid mixture and at the same time allows the volume of the liquid at the outer container to more easily achieve the needed pressure required to be exerted on the liquid inside the inner container for the separation. In this design, the gas reduced or gas free electrolyzed liquid, herein using acidic water as example, is collected or discharged from outlet port 20 located at the top of the outer container 12 to avoid any air pocket from forming. Other locations of the outlet port at the outer container, although these may satisfy the height/volume requirement, may create the air pockets mentioned above which may affect the operation of sensing devices, if these are incorporated into the system.

Figure 3:
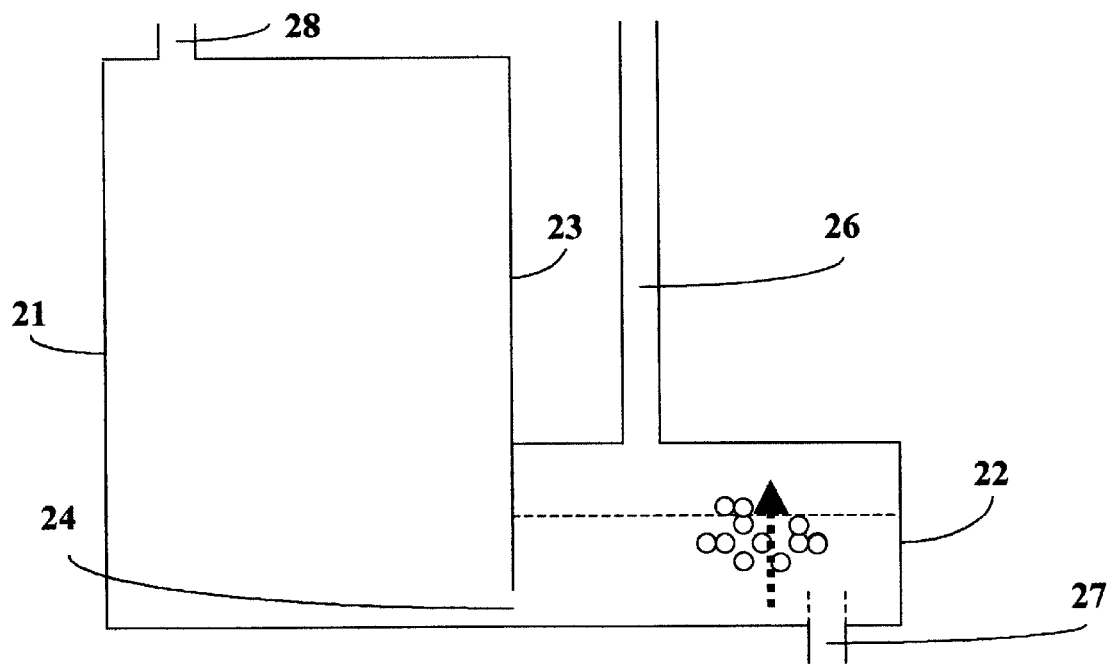
FIG. 3 shows another design of a simplified gas-liquid separator suitable for use with an electrolysis system.
Figure 3A:
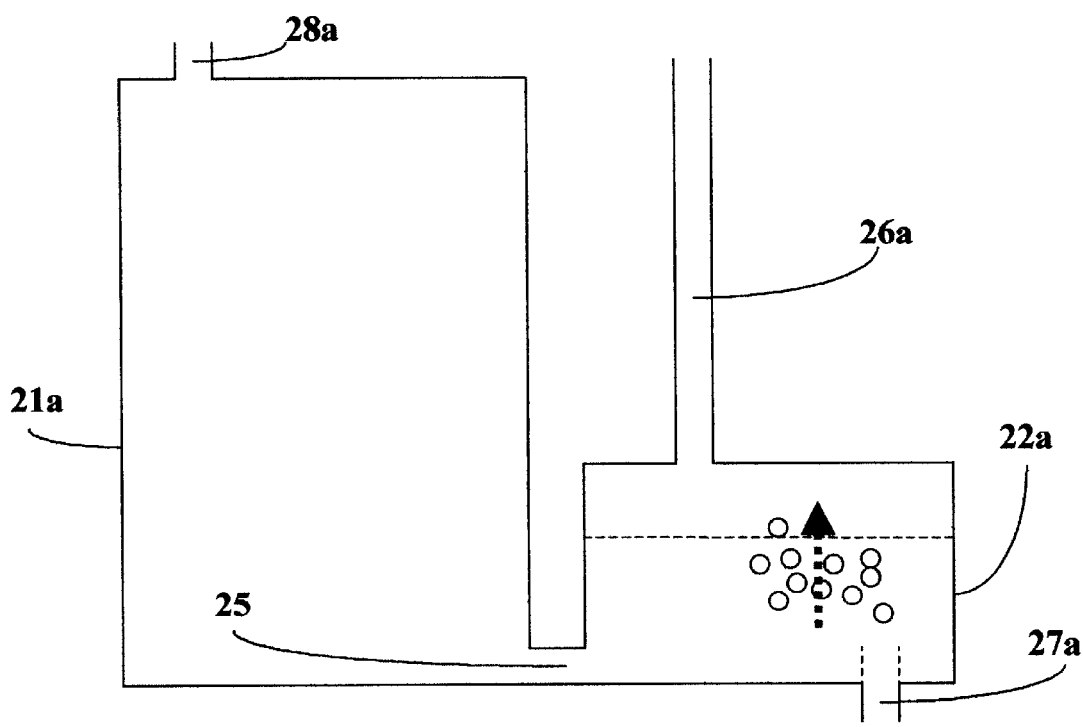
FIG. 3A shows a modification of the simplified gas-liquid separator shown in FIG. 3.

The gas-liquid separator can also have the containers connected to each other as shown by FIGS. 3 and 3A. The parts in FIG. 3A that corresponds to those in FIG. 3, are labeled with the letter "a". However, mention of the number even without the letter "a" will apply to both. In this design, there is a taller container 21 and a shorter container 22. The shorter container may be adjacent to the taller container, having a common wall 23 partitioning the containers and a common open channel 24 connecting the two containers where the liquid from container 22 can flow to container 21 and vice versa as shown by FIG. 3. The open channel may also be designed as a passageway 25 connecting the taller container 21 with the shorter container 22. In these designs shown in FIGS. 3 and 3A, the gas is separated from the liquid at the shorter container 22 with the same principle as that employed at the inner container 13 described above. Therefore, the volume of the liquid at the taller container 21 should exert enough pressure to the volume of liquid inside the shorter container 22 so that the gases separated from the liquid at the shorter container will escape from the gas outlet port 26 preferably located at the top of the shorter container instead of escaping with the liquid through the open channels 24 or 25. Also, like the gas-liquid separator shown in FIGS. 2 and 2A, the shorter container should be as wide as possible and as short as possible so long as it has enough volume above the outlet port or channel 24 or 25, to hold the volume of the liberated gas while the taller container is being filled at the start of the separation process. The inlet port to the shorter container for the electrolyzed gas liquid mixture is labeled 27 while the outlet port for the gas reduced or gas free liquid is labeled 28. The challenge for the above gas-liquid separators is to prevent the separated gases from recombining with the liquid thereby escaping with the liquid at the outlet ports 20 or 28. There are several ways and methods to maintain the gas separated from the liquid. This condition can be met by ensuring that there is enough pressure exerted by the liquid at the outer container 12 or the taller container 21 on the liquid at the inner container 13 or the shorter container 22, respectively. Also, the volume of the inner container or the shorter container must be such that it can hold all of the volume of the separated and liberated gases as the gas reduced or gas free liquid fills the outer or taller container at the start of the process. Therefore the design of the outer or taller container is crucial. This can be easily arrived at by mathematical calculation or by actual experimentation. Since the gas-liquid separator can be of different shapes, volumes and dimensions, the specific dimensions for each particular shape and volume will vary. Even after arriving at the right relative dimensions of the containers, it is apparent that there is still a possibility that the volume of the gas reduced or gas free liquid flowing from the inner or shorter container to the outer or taller container would not exert enough pressure to keep the gases sequestered and flowing/discharging at the outlet ports 19 or 26. This usually happens when the gas reduced or gas free liquid is just in the process of filling the outer or taller container. To ensure that the volume of the inner or shorter container can hold the separated gases that are collected in the container prior to discharge as the liquid fills the outer or taller container, the volume of gas evolved or separated per unit time should be predetermined. The same gas-liquid separator can be used for this. With a liquid filled gas-separator, i.e., both containers (outer and inner or taller and shorter) filled with the same type of liquid to be separated, therefore having enough pressure exerted from the outer or taller container to the inner or shorter container, the gas liquid mixture is introduced into the inlet port of the inner or shorter container and the volume of gas separated/evolved from the liquid is measured with time. Therefore, hypothetically, if 100 ml. of gas is evolved per 300 ml. of liquid separated and it requires 1500 ml. of liquid on the outer or taller container to exert the required pressure on the inner or shorter container, then the volume of the inner or shorter container should be approximately 800 ml. or more above the outlet port 18 or the open channels 24 and 25, depending upon where these ports or channels are located in the gas-liquid separator.

Since the shapes and dimensions of the containers and other conditions such as geographical location, temperature, type of gas and specific gravity also influence the amount of pressure exerted or required to achieve gas separation, there are simpler approaches that can be used to avoid the problem of insufficient pressure while the outer or taller container is being filled with liquid coming from the inner or shorter container. The cheapest approach is to prefill the two containers of the gas-liquid separator with a gas free or gas reduced liquid obtained from a previous electrolysis run prior to separating the gases from a new batch of gas liquid mixture coming from the electrolysis cell chambers. This will avoid the problem of ensuring sufficiency of pressure from the outer or taller container to keep the gases escaping through outlet ports 19 and 26.

Figure 4:
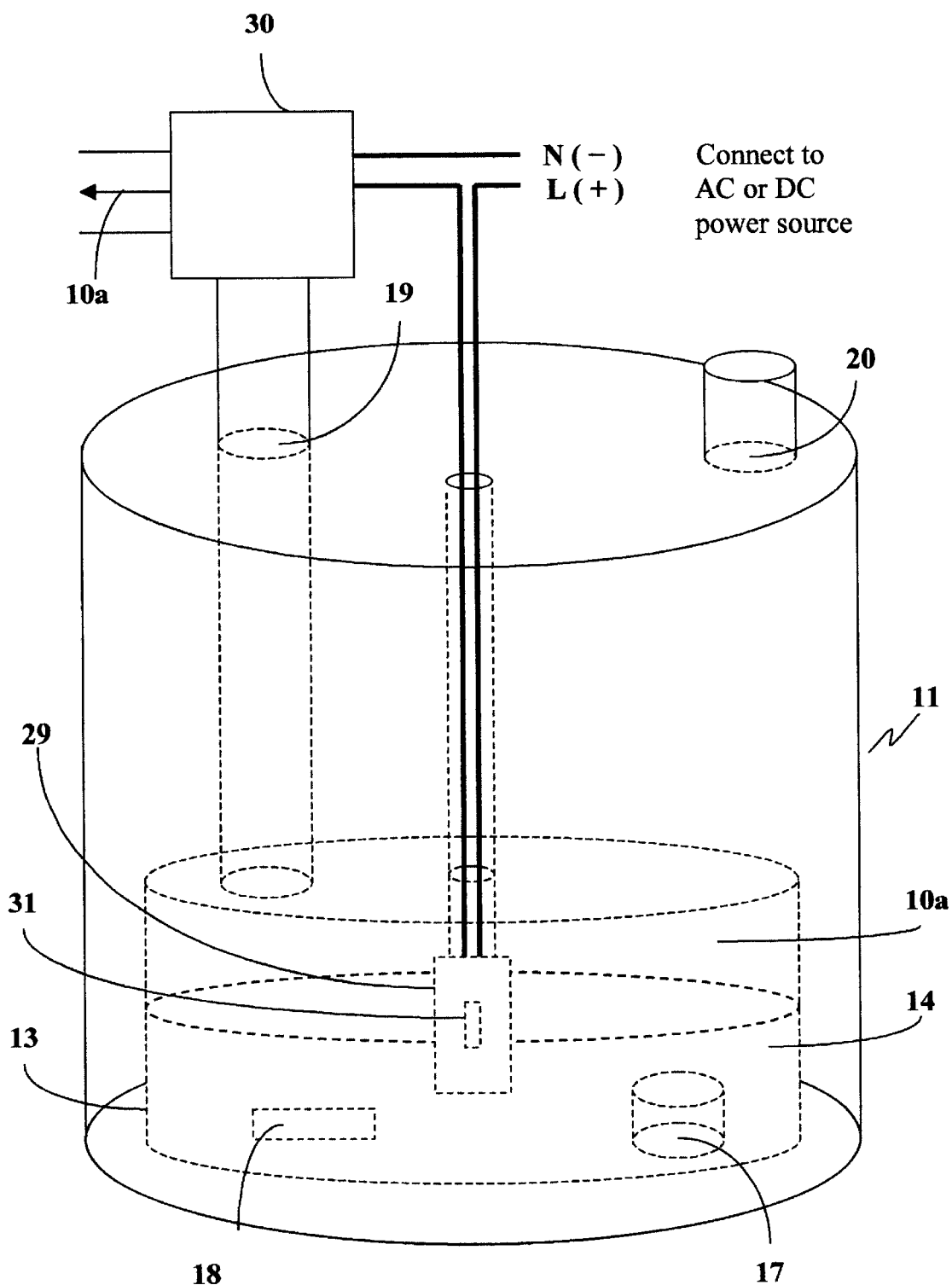
FIG. 4 shows the simplified gas-liquid separator of FIG. 2 with a level switch connected to a vacuum pump.
Figure 5A:
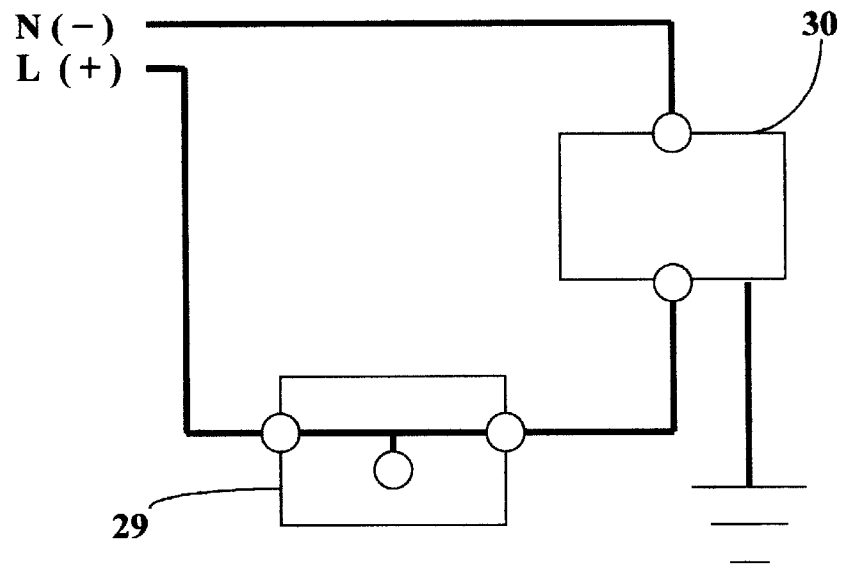
FIG. 5A shows the circuit when the switch is closed thereby turning on the vacuum pump.
Figure 5B:
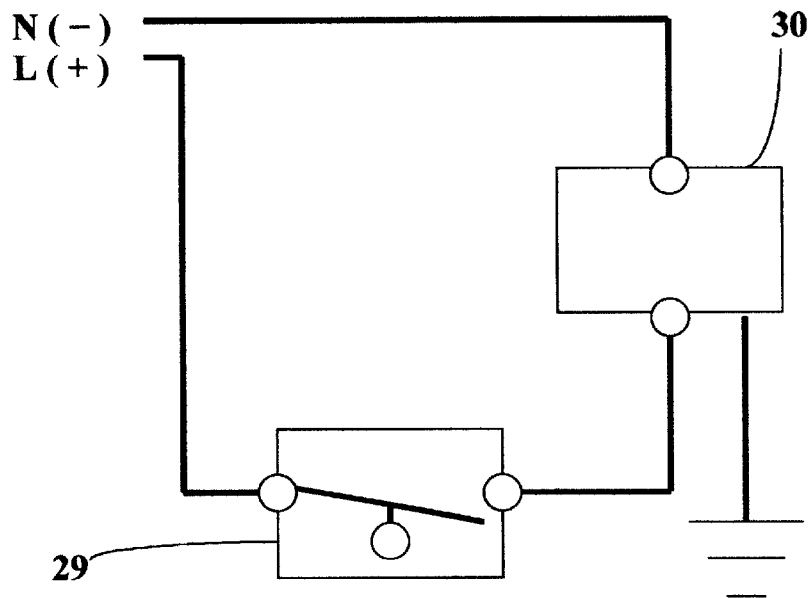
FIG. 5B shows the circuit when the switch is open thereby turning off the vacuum pump.

Another approach is shown in FIG. 4. Although FIG. 4 shows only one type of the gas-liquid separator, this approach also applies to the other types of gas-liquid separators described. Here, the need for sufficient pressure is not as crucial, that is, the height or volume of the liquid at the outer or taller container relative to the inner or shorter container is no longer critical. In this design, a level sensor or switch 29 is placed inside the inner 13 or shorter container 22. A level sensor/switch is a device to detect the liquid level inside a container. The level switch 29 is electronically connected to a vacuum pump 30 connected to the gas outlet port 19 or 26. The detecting component 31 of the level switch is placed above the top of the outlet port 18 or the open channels 24 and 25 of the inner or shorter container depending upon which type of gas-liquid separator is used. It is also preferably placed away from the inlet port 17 to keep it from the motion of the liquid as it enters the inner or shorter container which may affect the detecting capability of the detecting component. At the start of the process when the gas-liquid separator is either empty or just in the process of being filled with the gas-liquid mixture, the electrical connection between the level switch and the vacuum pump is closed, thereby turning on the vacuum pump which draws the gas towards the pump as shown in FIG. 5A. When the level of the liquid 14 inside the inner or shorter container is above the detecting component 31 of the level switch 29, depending upon the set up of the switch, the electrical connection between the level switch and the vacuum pump disconnects to turn the vacuum pump off as shown in FIG. 5B. As the gas accumulates on top of the inner or shorter container during the separation of the gas from the liquid because the vacuum pump is turned off, the level of the liquid inside the inner or shorter container will be pushed down by the gas and when the level of the liquid goes below the detecting component 31, the level switch will automatically reconnect with the vacuum pump 30 to turn the pump on. The vacuum pump will again draw the gases out of the inner or shorter container and allow the level of the liquid to rise above the detecting component 31 and when this happens, the vacuum pump will again shut off. This operation is continued and these step repeated until all the gas liquid mixture has been processed through the gas-liquid separator.

Figure 6:
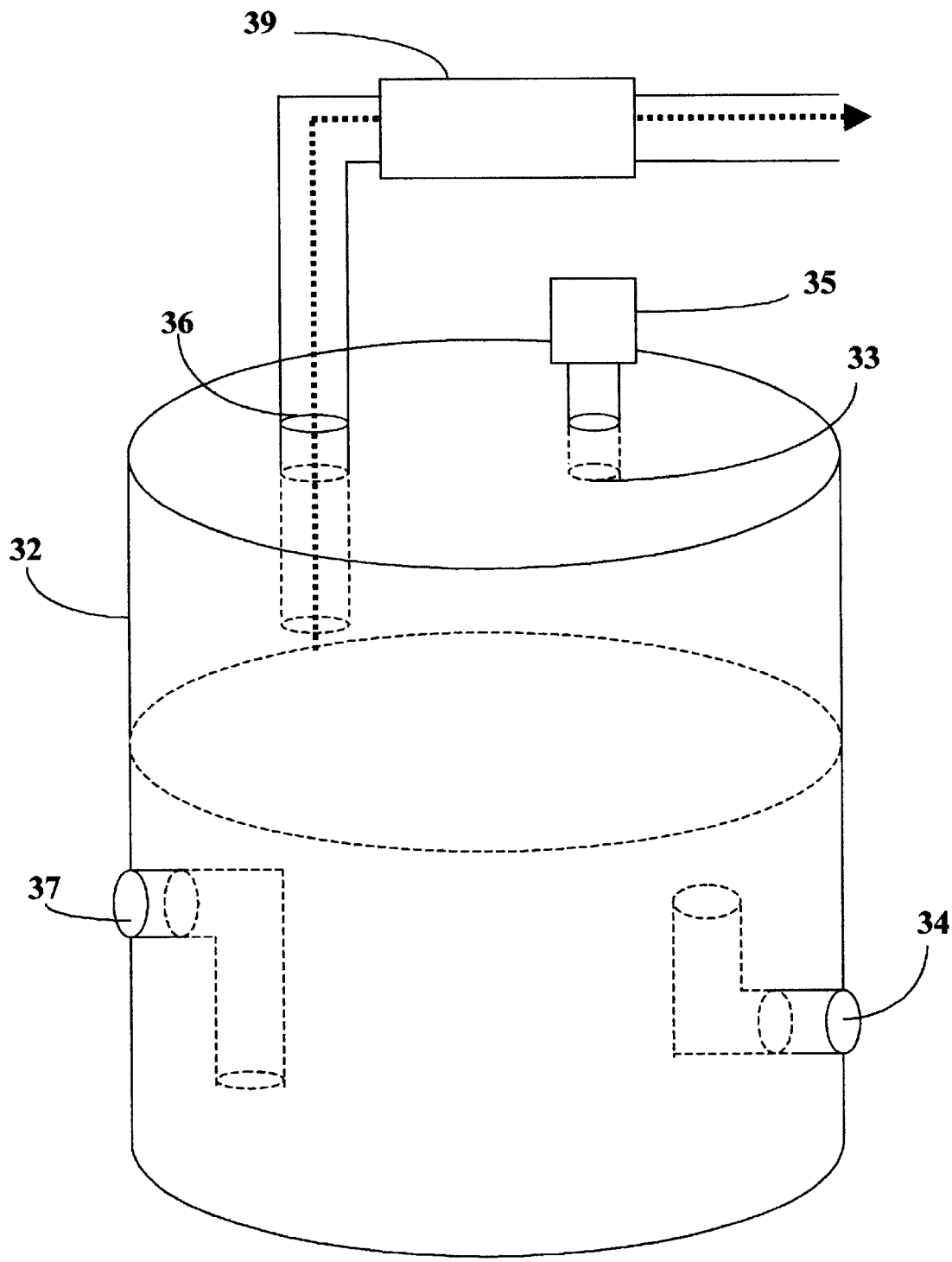
FIG. 6 shows a set up that can achieve gas liquid separation also suitable for use with an electrolysis system.
Figure 6A:
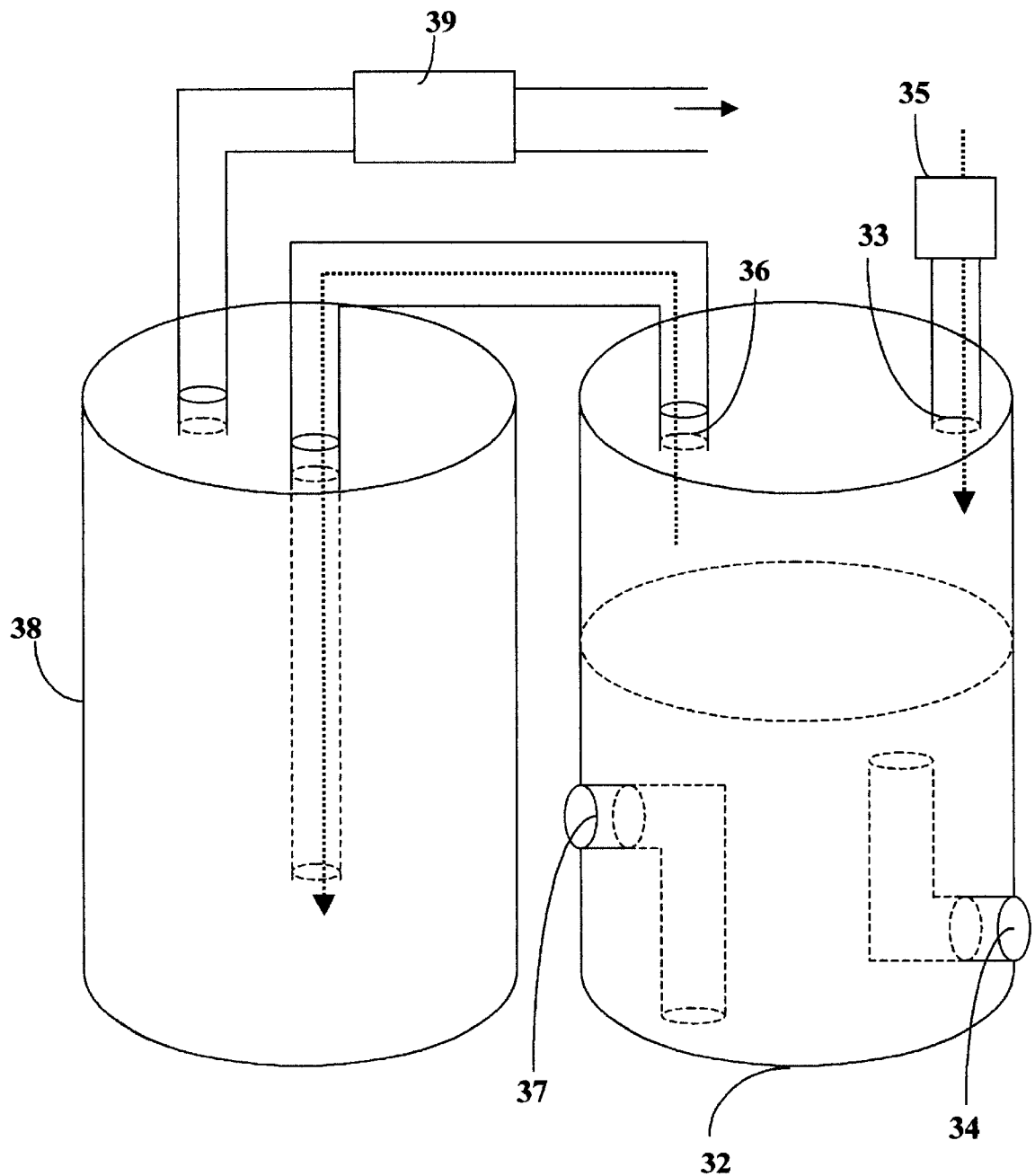
FIG. 6A shows the set up of FIG. 6 having an additional container to catch any moisture carried by the gas prior to introduction into the vacuum pump.

A set up with a vacuum pump but without a level switch as shown by FIG. 6 can also be employed. This set up does not operate under the same principles as those separation process described above using a two container gas-liquid separator. In this set up, the electrolyzed gas liquid mixture enters a container 32 having a hole 33 bored at its top end through inlet 34. An air filter 35 is preferably attached to the hole to keep any solid or debris from entering the container 32. The container 32 has an outlet port 36 for the separated gas, preferably also placed at the top end of the container and an outlet port 37 for the gas reduced or gas free liquid situated along one lateral wall, preferably midway, of the container 32 as shown in FIG. 6. In this set up, the vacuum pump is directly above the separated gas on top of the electrolyzed gas liquid mixture being separated, therefore care must be taken not to draw any liquid into the vacuum pump. To ensure this, the outlet port for the gas 36 is connected to another container 38 which is in turn connected to a vacuum pump 39 as shown in FIG. 6A. As the electrolyzed gas liquid mixture enters container 32, the separated gas from port 36 is drawn by the vacuum pump to container 38 before going through the vacuum pump. This latter set up will also provide a better means for preventing the recombination of the gas with the electrolyzed liquid. To maintain the pressure inside the container while the vacuum pump is on, air is allowed to enter the container at the hole 33 of the container. Maintenance of pressure also prevents liquid from being drawn to the vacuum pump. This set up does not separate the gas from the liquid without the aid of a vacuum pump, unlike the gas-liquid separators described above which can be used with or without the vacuum pump.

Bubbling of the separated gas or increase in volume occupied by the gas over time at the top of the respective containers where the gas separates from the liquid can be seen if the gas-liquid separator is made of clear material such as plastic. The gas-liquid separator may be fabricated from metal or plastic material compatible with the type of gas and electrolyzed liquid introduced into the gas-liquid separator. The gas reduced or gas free liquid coming from the gas-liquid separator is collected for immediate usage or stored until needed. The separated or evolved gas, chlorine if the feed solution is a chlorinated electrolyte such as brine and water, can be tested from the respective gas outlet ports 19, 26 or 36 or indirectly from the hypochlorite concentration produced from the reaction of the chlorine gas with a given volume of alkaline water from the cathode chamber. The system can have the same design or type of gas-liquid separator or a combination of different types of gas-liquid separator in one set up. For example, a system can have both gas-liquid separators connected to each electrolysis cell chamber with the inner/outer container design while another system can have different gas-liquid separator design, one with the inner/outer container while the other with the shorter/taller container design. All alternate gas-liquid separator designs can be mixed or matched. Also, gas separators shown in FIGS. 6 and 6A or the modified gas-liquid separator shown in FIG. 4 can also be mixed and matched with the gas-liquid separators shown in FIGS. 2, 3 and 3A, if desired.

For the systems employing gas-liquid separators without a vacuum pump, to ensure that the gas escapes from the outlet ports 19 and 26, the pressure and rate of flow of the electrolyzed liquid into inlet ports 17 or 27 should be the same or greater than the pressure and rate of flow of the electrolyzed liquid out of the gas-liquid separator at outlet ports 20 and 28. Expressed differently, the pressure and rate of flow at the outlet ports 20 and 28 should not exceed the pressure and rate of flow of the liquid at port 17 or 27. The pressure at outlet port 20 or 28 is usually less than that at outlet port 17 or 27 because the pressure exerted by the outlet port 17 or 27 to the outlet port 20 or 28 is reduced by the amount of pressure required to push the gas/es out of gas outlet ports 19 or 26 which should be determined and maintained throughout the separation process. This condition can be achieved and checked by several means. For example, by installing a pressure/flow sensor at the inlet ports 17 or 27 and the outlet ports 20 and 28. A pressure/flow sensor is a device for measuring the pressure/flow of a liquid. A valve is additionally connected to the outlet ports 20 and 28 to adjust the pressure/flow of the liquids in such a way that the flow of the electrolyzed gas reduced or gas free liquid out of the outlet port 20 or 28 is no more than the pressure/flow of the electrolyzed gas liquid mixture into the inlet port 17 or 27. A valve can also be connected to the inlet port 17 or 27. As stated above, the difference between the pressure at the inlet port 17 or 27 and the pressure at outlet port 20 or 28 is the pressure required to push the gas out of the gas outlet ports 19 or 26. Other devices other than valves can be used to achieve the same purpose such as regulators installed at the outlet ports to ensure that the pressure/flow of the liquid at the outlet ports will not be greater than the flow at the inlet ports.

Figure 7:
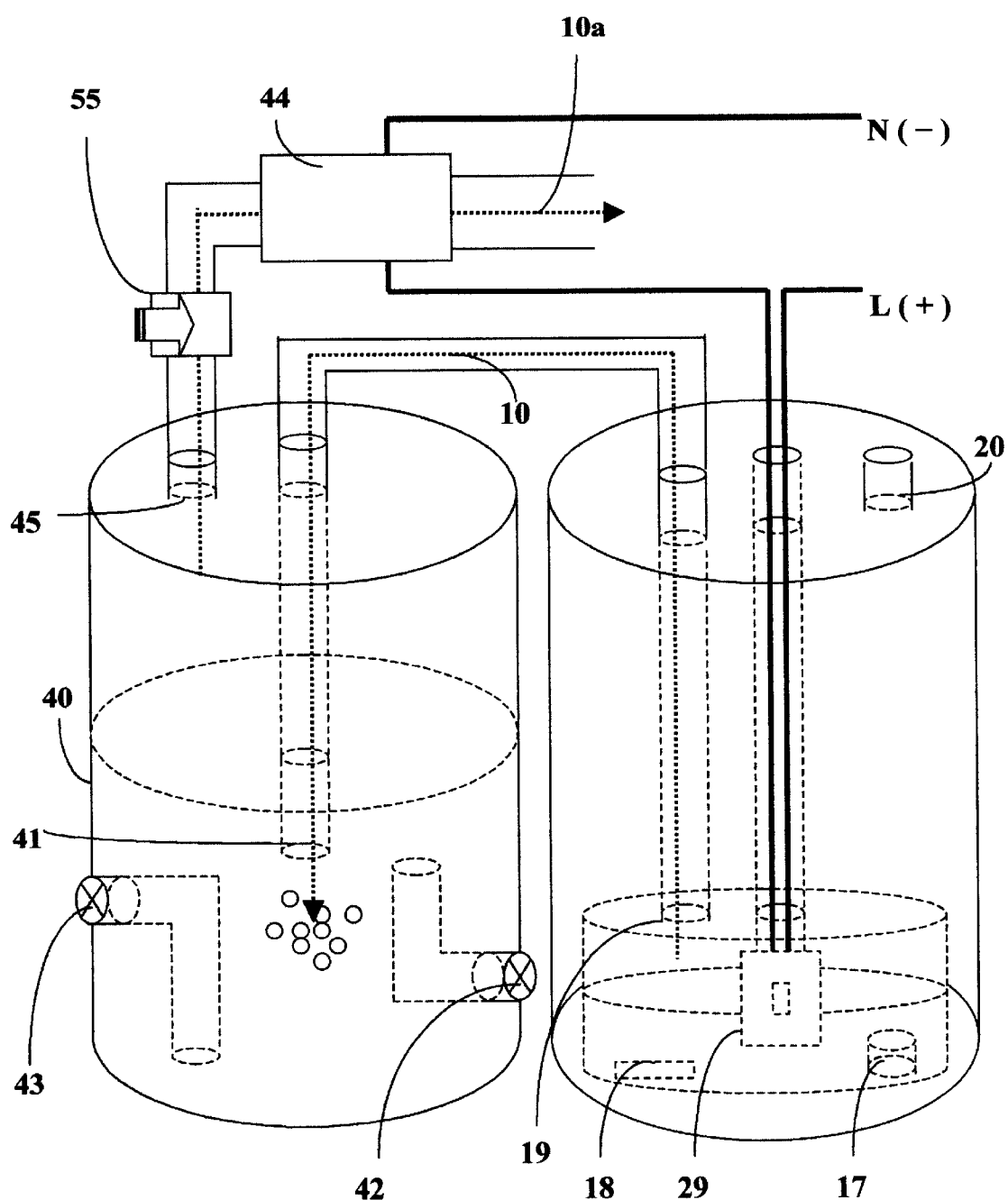
FIG. 7 is a back end diagram of the electrolysis system for one method of collecting and converting the chlorine gas to sodium hypochlorite solution or bleach.

To recover or reprocess the chlorine gas 10, this is introduced into a hypochlorite production vessel 40 containing alkaline water from the cathode chamber through a feedline having an inlet 41 located below the level of the alkaline water as shown in FIG. 7. The alkaline water reacts with the chlorine gas to form hypochlorite. The alkaline water from the cathode chamber may be continuously flowed from port 42 to port 43 of production vessel 40 while the chlorine gas is fed at inlet 41. Under this condition the resulting hypochlorite concentration is low and may be lower than the desired hypochlorite concentration. To recover chlorine gas at a level suitable for producing a bleaching solution, port 43 is closed and vessel 40 is filled batchwise with only a given volume of alkaline water at vessel 40, and chlorine gas 10 from 19 or 26 is introduced through inlet 41 of the vessel 40 until the desired level of hypochlorite is obtained. The hypochlorite concentration can be determined manually or automatically by means known in the art. At this point, the bleaching solution is drained from the production vessel at port 43 and a fresh batch of alkaline water is again introduced into the vessel 40 through port 42. Both ports 42 and 43 individually have a means for closing and opening the port at will, such as a valve, to be able to drain or replenish the vessel with alkaline water. To ensure that chlorine gas flows into the alkaline water, the height of the alkaline water level at vessel 40 should not exert pressure or resistance to the flow of the liquid and gases from the gas-liquid separator so as to deter the gas from freely flowing out of port 19 or 26. The flow of the gas can be monitored visibly or by means of a flow detector connected at ports 19 and 26. To facilitate the flow of chlorine into the production vessel 40, a vacuum pump 44 may be connected to the production vessel at a top opening 45, to exert a negative pressure inside the vessel 40. The negative pressure exerted by the vacuum pump 44 should not be so much as to also withdraw the liquid at the production level vessel 40. The capacity of the pump should be adjusted to ensure this or a pressure relieve valve 55 can be installed either at the production vessel or along the line connecting the vessel 40 to the vacuum pump 44 to maintain the desired pressure inside the production vessel 40. Alternately, a level switch can also be installed at vessel 40 in a similar manner and principle as that described above for the gas-liquid separators to prevent withdrawal of liquids into the vacuum pump. The bleaching solution from vessel 40, may be further purified to remove other contaminants from the hypochlorite, if desired.

No detailed equipment or apparatus specifications are recited herein because the size of the gas collection system may be adjusted to any desired size which consequently will require readjustments of the voltage, flow, temperature and pressure conditions of the electrolysis process. The type and capacity of the vacuum pump is dictated by the volume being processed. The gases which is primarily hydrogen if brine is used as feed solution, is collected from the cathode chamber instead of chlorine from the anode chamber. These gases, liberated from the gas-liquid separator connected to the cathode chamber, can be treated similarly as the chlorine gas from the anode chamber. These are either vented, preferably with the aid of vacuum, if it is not at a hazardous/ toxic level, adsorbed or absorbed into a scrubber or it may be collected from the gas outlet port for further processing, if needed.

Figure 8:
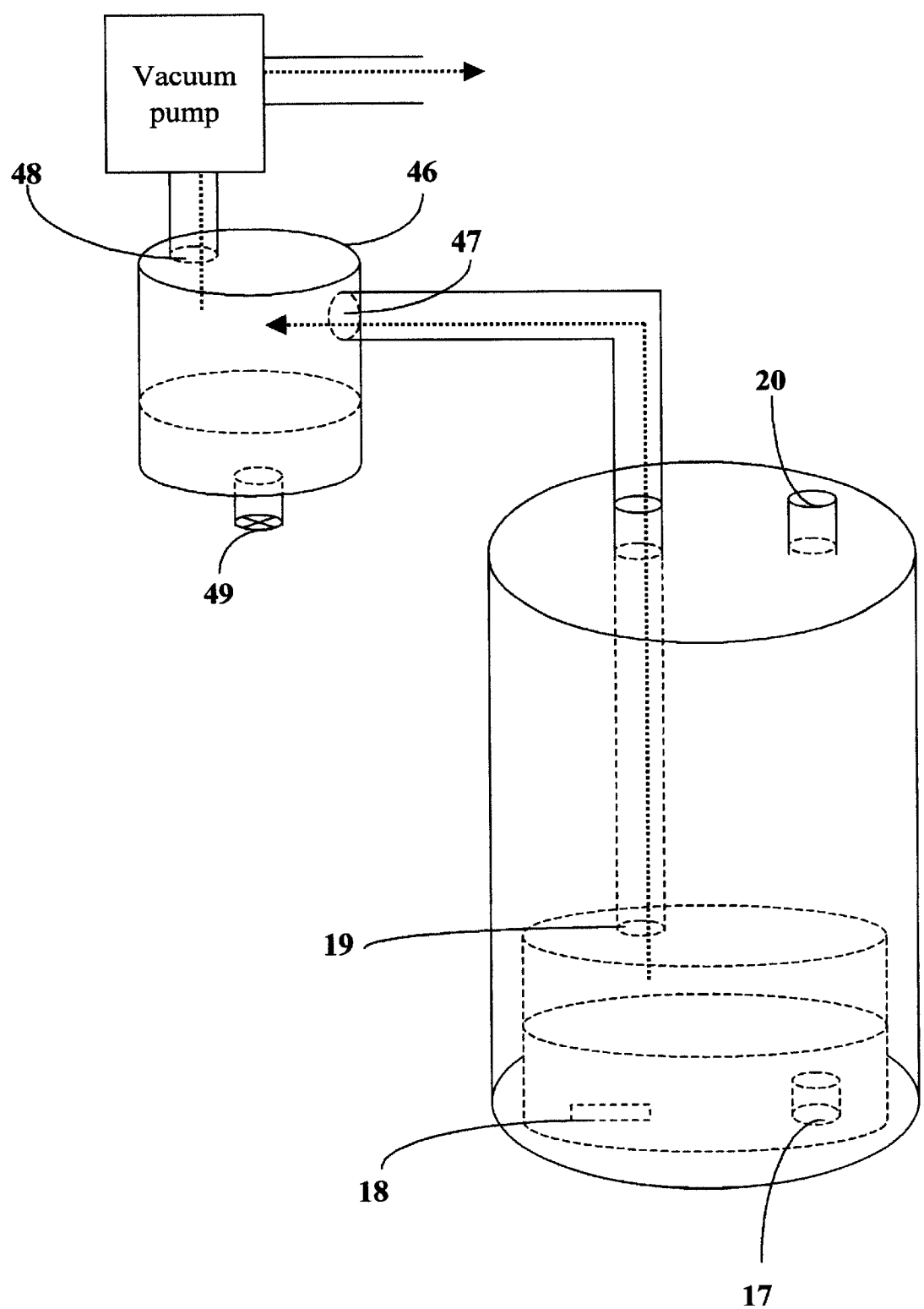
FIG. 8 shows a gas collection system with a moisture trap.
Figure 8A:
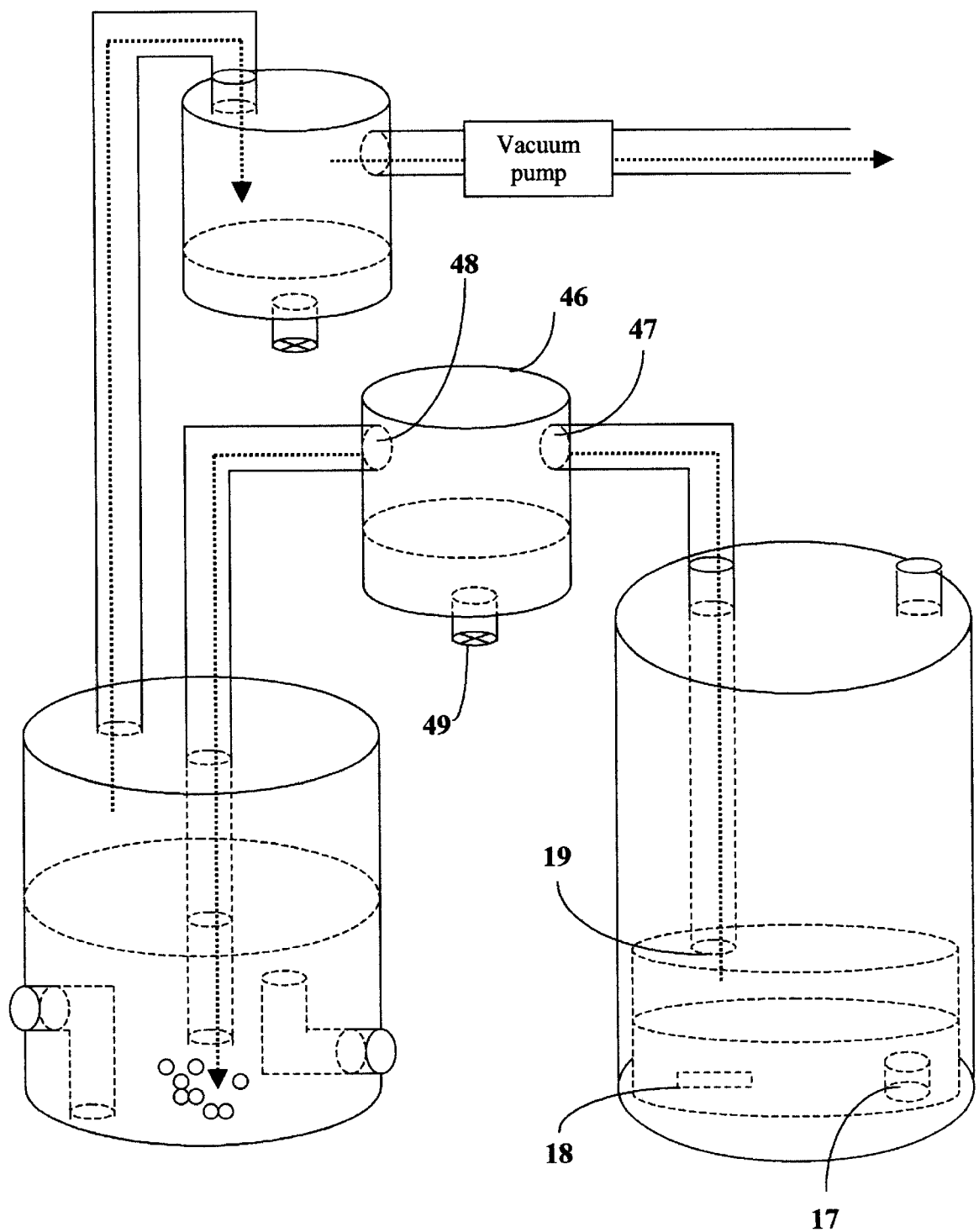
FIG. 8A shows a use of two moisture traps for the recovery of the chlorine gas.

If desired, a moisture trap 46 or a condenser can be installed before a vacuum pump to ensure that the gas flowing through the vacuum pump is dry since liquid may damage or lessen the life of the vacuum pump. FIG. 8 shows the moisture trap connected to a gas outlet port of a gas-liquid separator while FIG. 8A shows the moisture trap connected to an opening of a production vessel. The moisture trap may be as simple as an enclosed container with a gas inlet 47 and a gas outlet 48 with a liquid drain 49. The moisture trap can have dessicants inside to assist in the absorption of the liquid and other condensers known in the art may also be used. FIG. 8A also shows how the moisture trap can be used in the process for recovering chlorine as hypochlorite shown in FIG. 7.

Figure 9:
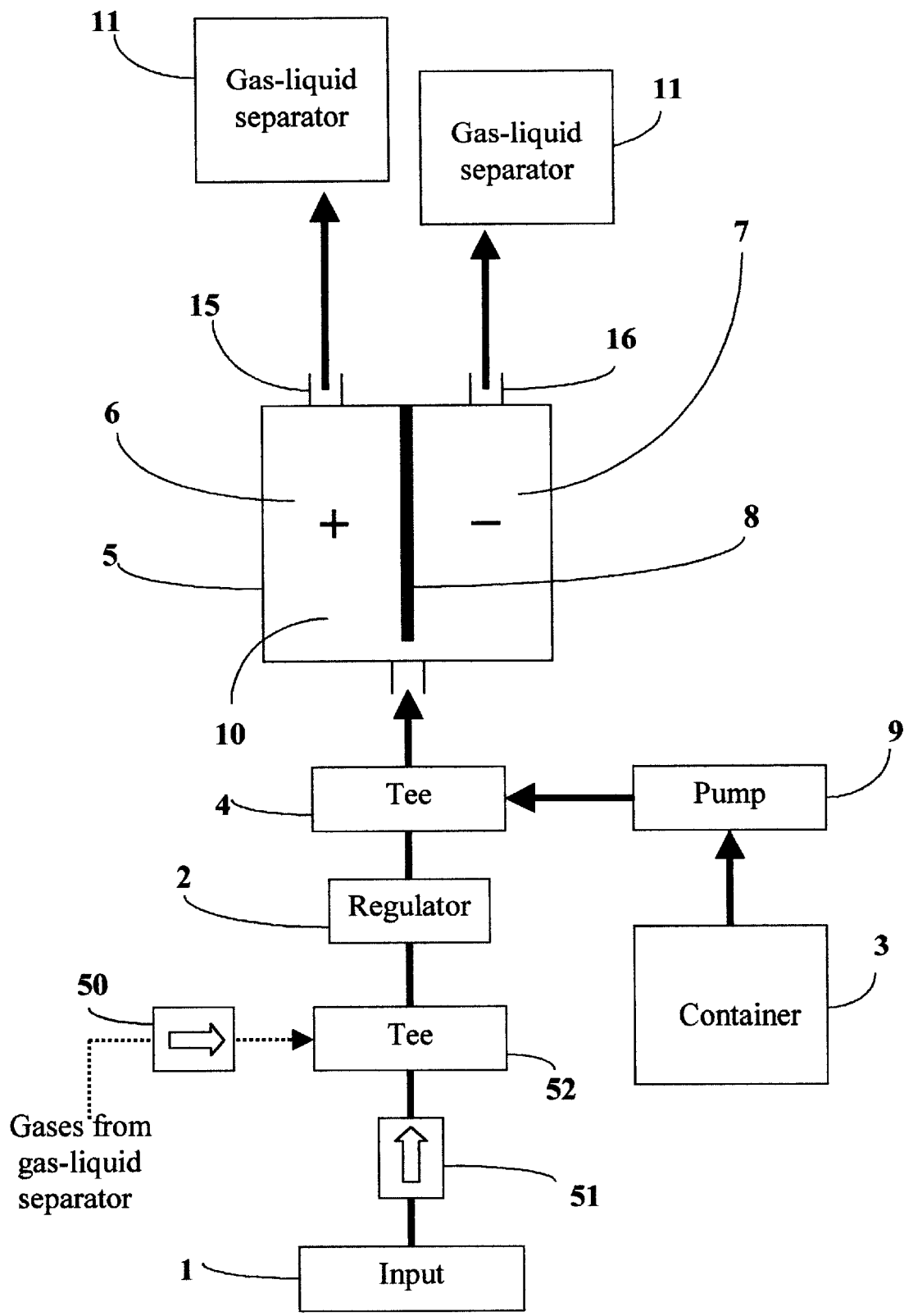
FIG. 9 shows a front end of the electrolysis system with the separated chlorine gas recycled by combining with the brine feed solution.

Instead of producing sodium hypochlorite, the liberated chlorine gas coming from the gas-liquid separators can be recovered or reprocessed by combining the gas with the feed solution instead of reacting with the alkaline water at vessel 40. A one way valve 50 and 51 in the direction towards the electrolysis cell may be installed before the tee 52 to aid in the direction of the flow of the feed and the gas. This method will potentially produce a more concentrated hypochlorous acid at the anode chamber or reduce the requirement of brine, if desired, as shown in FIG. 9. In situations when a targeted concentration of hypochlorous acid is desired which require the testing and adjustment of the chloride concentration of the feed solution prior to introduction into the electrolysis cell, the additional chlorine gas will require the addition of less brine than what would be required if chlorine is not added to the feed solution. This also provide some cost saving in the amount of brine needed. The production vessel 40 and the tee 52 both provide a compartment where the chlorine gas can either react with the alkaline water or dissolve into the feed solution.

The gases from the electrolysis chambers of the anode and the cathode if not recovered, recycled or reprocessed, can be reduced or eliminated by absorption or adsorption into a gas scrubber or by reaction with other gases or compounds, with or without the aid of catalysts. The scrubbers or reactants are connected to the respective gas outlets from the gas-liquid separator. This approach entails added cost for the scrubber and continuing cost for the scrubbing media. Also, unlike the treatment described above, the process to recover the absorbed or adsorbed gases from the scrubbing medias or reactants is more complex such that these scrubbers are usually discarded after saturation with the gases.

Although this system is designed to reduce or eliminate the liberation of toxic gases, for added safety in case there is a system failure, gas monitors or gas leak detectors may be installed either on-line or by collecting each individual gases of interest for testing. The gas leak detectors may be installed within the unit or cabinet housing the electrolysis system, at the vicinity of the outlet port or collection tank for the gas reduced or gas free liquid or remotely within the room where the electrolysis system is installed or located.

To prevent clogging of the gas-liquid separator brought about by scaling, the system can be periodically cleaned by an acid and/or base solution. However, it is proposed here to clean the gas-liquid separator by periodically switching the positions of the gas-liquid separators connected to the electrolysis cell, that is, the gas-liquid separator connected to the anode chamber is switched to the cathode chamber while the gas-liquid separator from the cathode chamber, if there is one, is switched to the anode chamber and vice versa. The cleaning process may be done manually or it can be automated.

Figure 10:
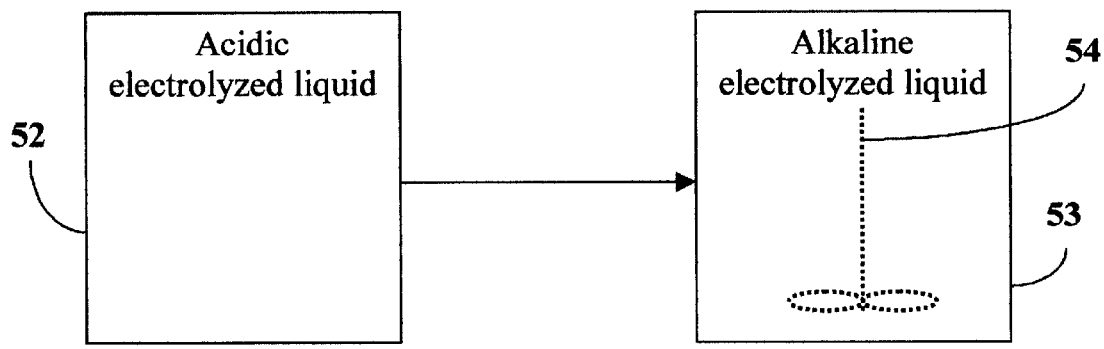
FIGS. 10 and 10A show one method for safely discharging electrolyzed liquid into the sewage system.
Figure 10A:
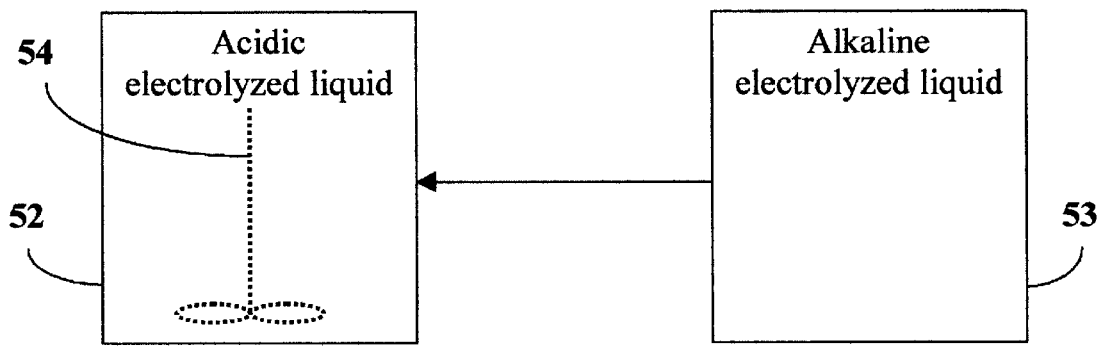
Figure 11:
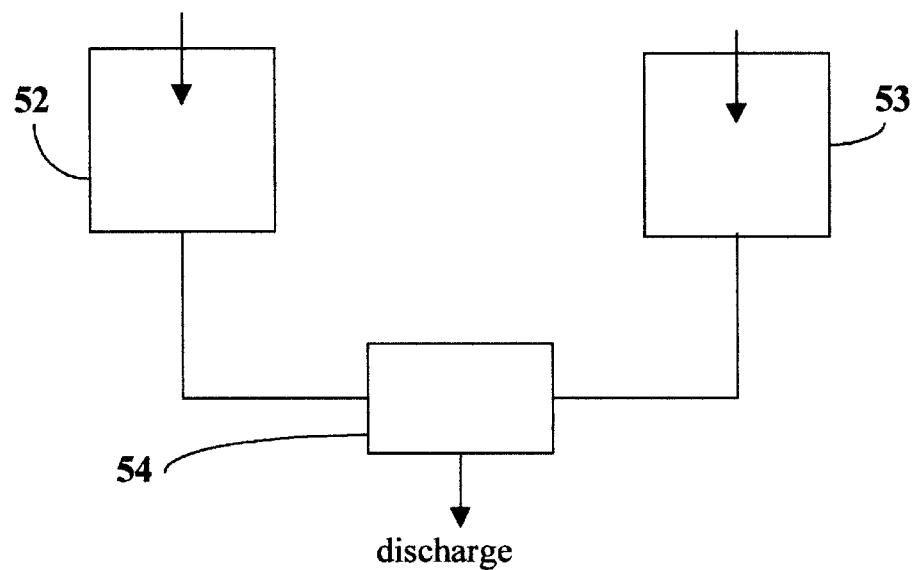
FIG. 11 show another method for safely discharging electrolyzed liquid into the sewage system.

Another potential problem in the production of electrolyzed liquids is the discharge of these liquids such as the acidic and alkaline electrolyzed liquids from the electrolysis of salt water into the drain or the sewage system due to their respective pH conditions. The respective pH of these liquids may be above or below that permitted for dumping into the sewage system. A system to address this problem is shown in FIGS. 10 and 10A. Acidic electrolyzed liquids coming from the gas-liquid separator or directly from the anode chamber 6 or used acidic electrolyzed liquids after its individual applications, are collected in a tank 52. Similarly, alkaline electrolyzed liquids from the gas-liquid separator or directly from the cathode chamber 7 or used alkaline electrolyzed liquids after its individual applications, are collected in another tank 53. The acidic and alkaline electrolyzed liquids are mixed until the acceptable pH condition is reached, as detected by pH detectors which are commercially available, before dumping this into the drain or the sewage system. Mixing can be done either by introducing the acidic electrolyzed liquid from tank 52 into the alkaline electrolyzed liquid tank 53 equipped with a mixer 54 or vice versa as shown in FIGS. 10 and 10A. When the pH of the mixed electrolyzed liquid from either tank 52 or 53, depending upon which tank was used for mixing the two, has reached an acceptable level for discharge, the liquid can now be drained or discharged into the sewage system. Alternately, acidic electrolyzed liquid from tank 52 and alkaline electrolyzed liquid from tank 53 are each fed into a mixing device 54 such as a venturi valve prior to discharge as shown in FIG. 11. The above systems can employ pumps to facilitate the transport of the liquids. pH detectors can be installed on line or samples can be taken and tested prior to discharge. The neutralized liquids may also be filtered and recycled back to the electrolysis system, if desired. This method of recombining new or used acidic electrolyzed liquid with new or used alkaline electrolyzed liquid produced from the same electrolysis system provides a solution to the problems associated with the discharge these two products, if not pretreated prior to dumping. These methods or obvious modifications to these avoid the additional cost and handling expenses of using external reagents such as absorbing medias, acids or bases designed to neutralize the electrolyzed liquids/products of the electrolysis system. Although the illustration addresses the problem relating to the pH condition of the waste products, this principle of recombining the products of electrolysis from the anode chamber with those from the cathode chamber to produce an acceptable waste product for discharge or dumping is within the scope of this invention.

In the system described above, care must be taken that all equipment and components are compatible with the feed solution, chemicals and with the electrolyzed products produced from the electrolysis cell.

The use of pure, deionized or distilled water and reagent or pharmaceutical grade chloride salts will reduce the liberation of toxic gases derived from the impurities of water and salt but not the liberation of hydrogen and chlorine so that use of the purer feed solutions, while more costly, does not eliminate the problems associated with these gases.

The whole system or parts thereof, their operation and/or testings individually or in combination with the other parts of the system, may be automated and/or controlled either with or without the use of computer technology.

While the embodiment of the present invention has been described, it should be understood that various changes, modifications and adaptations may be made therein without departing from the spirit of the invention and the scope of the appended claims. Those skilled in the art will recognize that other and further variations of the values presented herein are possible. The scope of the present invention should be determined by the teachings disclosed herein, the appended claims and their legal equivalents.

I claim:

1. An environmentally safe electrolysis system for producing electrolyzed liquids, comprising:
    an electrolysis cell having at least two chambers, an anode chamber and a cathode chamber, each chamber producing its own electrolyzed liquid;
    means for separating toxic gases produced along with the electrolyzed liquids during electrolysis;
    means for controlling proportions of the feed solutions introduced into the electrolysis cell;
    means for collecting gas reduced or gas free electrolyzed liquid;
    means for collecting the separated toxic gases; and,
    a feedline transporting the collected toxic gases to a compartment containing a liquid dissolving or reacting with the toxic gases thereby reducing the toxic gases liberated into the environment during electrolysis.

2. The electrolysis system of claim 1 wherein the means for separating gases is a gas-liquid separator comprising at least two containers, a first container for separating gas from a gas liquid mixture and a second container for receiving gas reduced or gas free liquid, the first container for separating gas from a gas liquid mixture having an inlet port for the electrolyzed gas liquid mixture from the electrolysis cell chamber, an outlet port for the gas reduced or gas free liquid below the level of the gas in the container, a separate outlet port for the separated gas, and a volume above the outlet port for the gas reduced or gas free liquid enough to hold the volume of the separated gas, the second container for receiving gas reduced or gas free liquid having a height taller than the height of the first container to hold enough volume that can exert pressure on the liquid inside the first container to allow or force the separated gas to escape from the gas outlet port of the first container while allowing the gas reduced or gas free liquid to exit at a separate outlet port of the second container.

3. The electrolysis system of claim 2 wherein the containers of the gas-liquid separator can have different geometric shapes.

4. The electrolysis system of claim 2 wherein the second container is an outer container and the first container is an inner container, the outer container having an inside surface larger than the outside surface of the inner container.

5. The electrolysis system of claim 2 wherein the first container is as wide as possible and as short as possible in relation to the second container and having the outlet port for the separated gas farthest from the inlet port for the electrolyzed gas liquid mixture.

6. The electrolysis system of claim 2 wherein the second container is a taller container and the first container is a shorter container having a channel allowing the flow of electrolyzed liquid from one container to the other.

7. The electrolysis system of claim 2 further comprising a means for preventing the recombination of the separated gas with the liquid and for maintaining the separation of the gas from the liquid.

8. The electrolysis system of claim 7 wherein the gas-liquid separator is prefilled with gas reduced or gas free electrolyzed liquid prior to separating gases from a gas liquid mixture from the electrolysis cell chamber.

9. The electrolysis system of claim 7 wherein a level switch having a detecting component is placed inside the first container, the level switch connected to a vacuum pump that turns on to withdraw the separate gas when the level of the electrolyzed liquid is below the detecting component and turns off when the electrolyzed liquid reaches a point above the detecting component of the level switch.

10. The electrolysis system of claim 7 wherein the pressure and/or flow of the gas reduced or gas free electrolyzed liquid out of the gas-liquid separator is the same or not greater than the flow and/or pressure of the electrolyzed gas liquid mixture from the electrolysis cell chamber into the first container.

11. The electrolysis system of claim 1 wherein the gas is separated from the electrolyzed gas liquid mixture by a vacuum pump connected to a gas outlet port of a container having an inlet port for the electrolyzed gas liquid mixture from the electrolysis cell chamber, an outlet port for the gas reduced or gas free electrolyzed liquid and an open port for allowing air to enter the container.

12. The electrolysis system of claim 11 wherein the separated gas from the container is withdrawn by the vacuum pump to a second container before the separated gas is drawn through the vacuum pump to prevent the separated gas from recombining with the gas reduced or gas free electrolyzed liquid.

13. The electrolysis system of claim 1 wherein the means for separating the gas can be of the same type or of different types.

14. The electrolysis system of claim 1 further comprising a means for reprocessing and recovering the separated gases.

15. The electrolysis system of claim 1 wherein the collection of gases produced during electrolysis is aided by a vacuum pump.

16. The electrolysis system of claim 15 further comprising means for preventing withdrawal of liquid into the vacuum pump.

17. The electrolysis system of claim 16 wherein liquid is prevented from entering the vacuum pump by a moisture trap installed before the vacuum pump.

18. The electrolysis system of claim 16 wherein a level switch having a detecting component connected to the vacuum pump turns on the vacuum pump only when the liquid level is below the detecting component.

19. The electrolysis system of claim 1 further comprising a gas monitor or a gas leak detector to detect system failure in eliminating the gases.

20. The electrolysis system of claim 1 wherein the chambers of the electrolysis cell are each connected to a gas-liquid separator or a number of gas-liquid separators, the gas-liquid separators may be of the same type or different type.

21. An environmentally safe electrolysis system, comprising:
an electrolysis cell having an anode and a cathode chamber, each chamber producing its own electrolyzed liquid;
means for controlling proportions of the feed solutions introduced into the electrolysis cell;
means for separating toxic gases produced along with the electrolyzed liquids during electrolysis;
means for collecting the separated toxic gases;
a feedline transporting the collected toxic gases to a compartment containing a liquid dissolving or reacting with the toxic gases to reduce toxic gases liberated into the environment during electrolysis;
means for separately collecting the electrolyzed liquid products from each electrolysis chamber; and,
means for neutralizing the electrolyzed liquid products from the anode chamber with the electrolyzed liquid products from the cathode chamber without addition of external reagents prior to discharge.

22. An environmentally safe electrolysis system for producing acidic water and alkaline water from brine, comprising:
an electrolysis cell having at least two chambers, an anode chamber producing the acidic water and a cathode chamber producing the alkaline water;
a gas-liquid separator for separating toxic gases produced during electrolysis comprising at least two containers, a first container for separating toxic gases from a gas liquid mixture and a second container for receiving gas reduced or gas free liquid, the first container for separating toxic gases from the gas liquid mixture having an inlet port for the gas liquid mixture from the electrolysis cell chamber, an outlet port for the gas reduced or gas free liquid below a level of the gas in the container, a separate outlet port for the separated gas, and a volume above the outlet port for the gas reduced or gas free liquid enough to hold the volume of the separated gas, the second container for receiving gas reduced or gas free liquid having a height taller than the height of the first container to hold enough volume that can exert pressure on the liquid inside the first container to allow or force the separated gas to escape from the gas outlet port of the first container while allowing the gas reduced or gas free liquid to exit at a separate outlet port of the second container;
means for controlling proportions of the feed solutions introduced into the electrolysis cell;
means for collecting gas reduced or gas free acidic water and gas reduced or gas free alkaline water;
means for collecting the separated toxic gases; and,
a feedline transporting the collected toxic gases to a compartment containing a liquid dissolving or reacting with the toxic gases thereby reducing the level of toxic gases liberated into the environment during electrolysis.

23. The electrolysis system of claim 22 further comprising a means for neutralizing the acidic water from the anode chamber with the alkaline water from the cathode chamber without addition of external reagents prior to discharge.

24. An system for the electrolysis of water and brine into acidic water and alkaline water that collects liberated toxic chlorine gas for reprocessing into a bleaching solution, comprising:
an electrolysis cell having at least two chambers, an anode chamber producing the acidic water and a cathode chamber producing the alkaline water;
a gas-liquid separator for separating chlorine gas produced during the electrolysis comprising at least two containers, a first container for separating gas from a gas liquid mixture and a second container for receiving gas reduced or gas free liquid, the first container for separating chlorine gas from the gas liquid mixture having an inlet port for the gas liquid mixture from the electrolysis cell chamber, an outlet port for the gas reduced or gas free liquid below a level of the gas in the container, a separate outlet port for the separated chlorine gas, and a volume above the outlet port for the gas reduced or gas free liquid enough to hold a volume of the separated gas, the second container for receiving gas reduced or gas free liquid having a height taller than the height of the first container to hold enough volume that can exert pressure on the liquid inside the first container to allow or force the separated gas to escape from the gas outlet port of the first container while allowing the gas reduced or gas free liquid to exit at a separate outlet port of the second container;

means for controlling proportions of the feed solutions introduced into the electrolysis cell;

means for collecting chlorine gas reduced or chlorine gas free acidic water and chlorine gas reduced or chlorine gas free alkaline water;

means for collecting the separated chlorine gases; and, a feedline transporting the collected chlorine gases to a vessel containing alkaline water, the feedline having an inlet below a level of the alkaline water to react the chlorine gas with the alkaline water thereby producing the bleaching solution.

* * * * *